Nov. 18, 1930.  W. E. KAY  1,782,305
CUTTING MACHINE
Filed Sept. 4, 1925  5 Sheets-Sheet 1

INVENTOR
Wm E. Kay
BY
Richey, Hough & Watts
ATTORNEY

Nov. 18, 1930.                W. E. KAY                1,782,305
                          CUTTING MACHINE
                   Filed Sept. 4, 1925      5 Sheets-Sheet 2
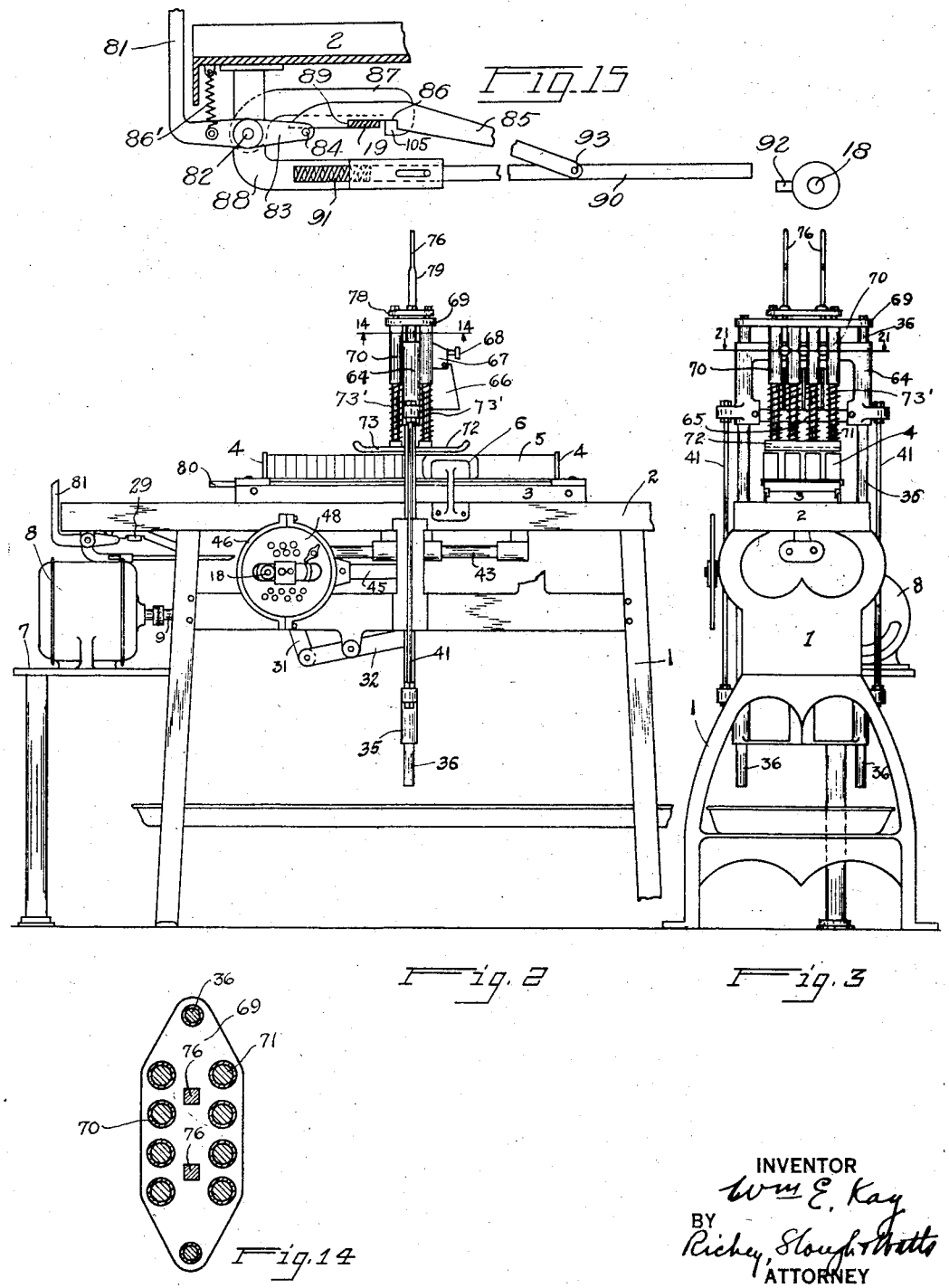

Nov. 18, 1930.                    W. E. KAY                    1,782,305
                              CUTTING MACHINE
                       Filed Sept. 4, 1925      5 Sheets-Sheet 3

INVENTOR
Wm E. Kay
BY
Richey, Slough & Booth
ATTORNEY

Nov. 18, 1930.   W. E. KAY   1,782,305
CUTTING MACHINE
Filed Sept. 4, 1925   5 Sheets-Sheet 4
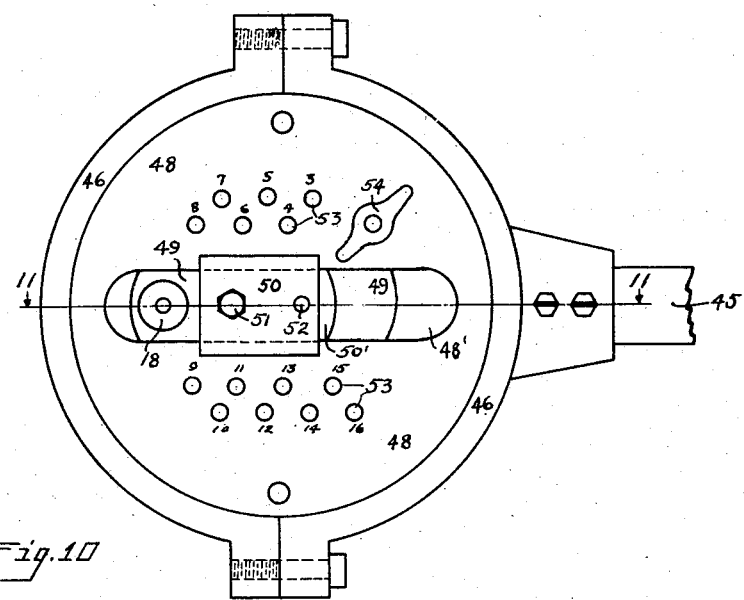
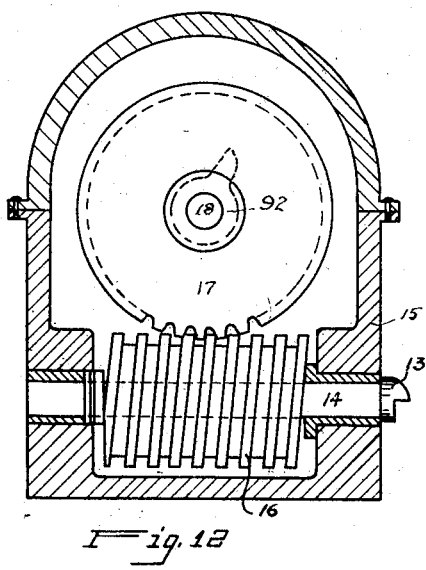
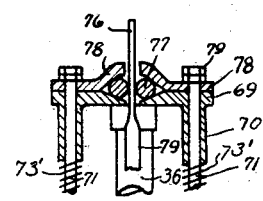
INVENTOR.
Wm E. Kay
BY
Richey, Stough & Watts
ATTORNEY.

Nov. 18, 1930.  W. E. KAY  1,782,305
CUTTING MACHINE
Filed Sept. 4, 1925  5 Sheets-Sheet 5
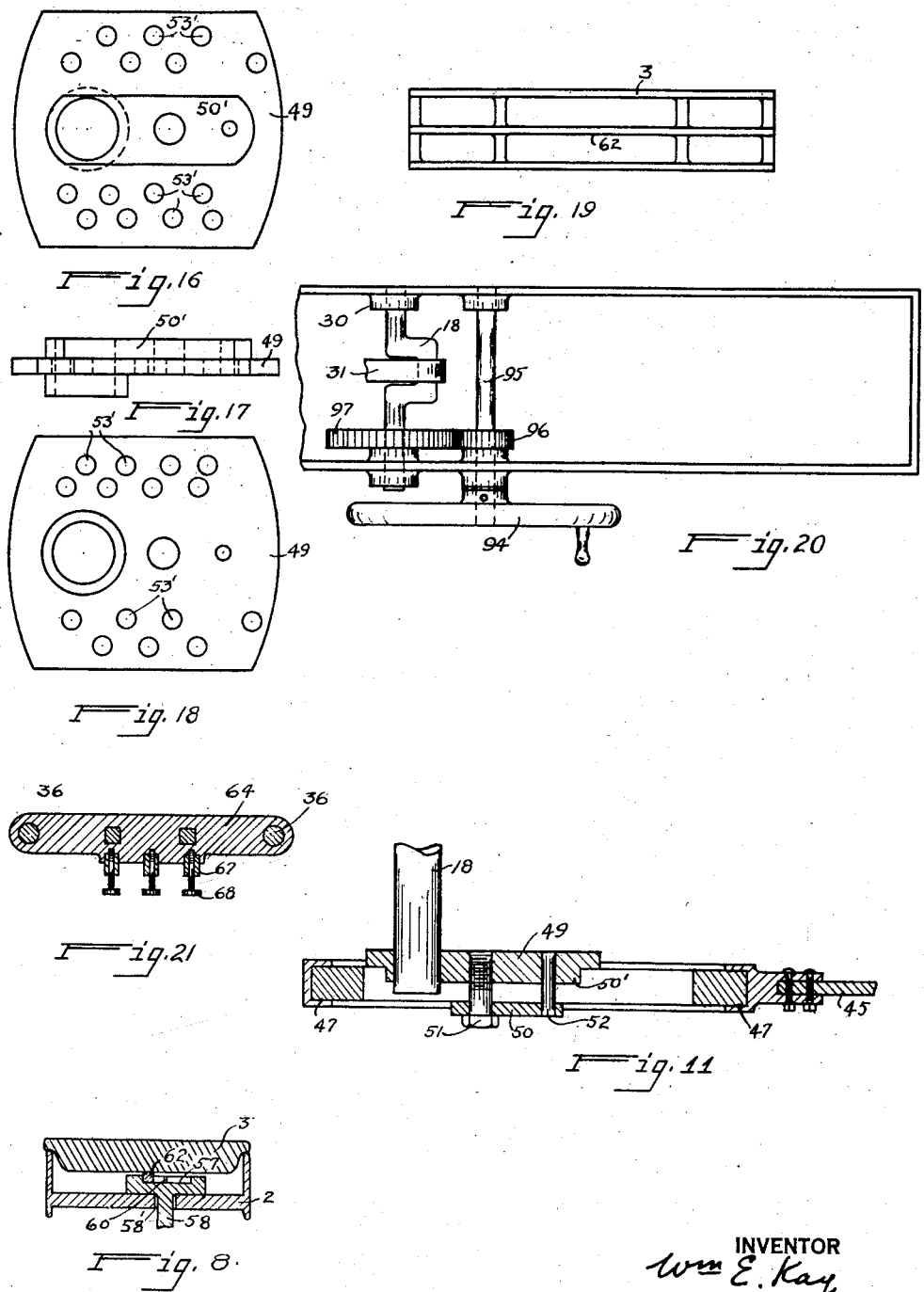

Patented Nov. 18, 1930

1,782,305

UNITED STATES PATENT OFFICE

WILLIAM E. KAY, OF ELYRIA, OHIO

CUTTING MACHINE

Application filed September 4, 1925. Serial No. 54,472.

My invention relates to apparatus for cutting materials and more particularly relates to machines for cutting food stuffs and the like, such as ice cream products, butter, cheese, vegetables and similar materials.

One of the objects of my invention is to provide apparatus of the above named character whereby materials such as ice cream products may be cut into sections of predetermined sizes or shapes.

Another object of my invention is to provide an apparatus of the class described whereby such materials may be cut in successive steps to predetermined sizes.

A further object of my invention is to construct apparatus of the class described whereby materials such as those named may be successively cut into sections of desired size and whereby upon the last cut said apparatus will be caused to automatically stop.

A still further object of my invention is to provide apparatus for cutting material into desired sections and providing means whereby a predetermined number of cuts may be made during the complete movement of the material along the path of the cutters.

Another object of my invention is to provide an apparatus of the class described wherein indexing means for the cutters has been provided for altering or increasing indefinitely the number of cuts per given quantity of material, so that the material may be cut into sections of predetermined size.

Another object of my invention is to provide a machine of the above named character which will accurately and efficiently cut materials, such as slabs of ice cream, and which is extremely simple of construction and operation.

Another object of my invention is to provide a machine of the above named character whereby a multiplicity of cutters is employed to cut the material, the cutters being arranged at angles to each other, if so desired, for cutting the material into various shapes.

Other objects and advantages of my invention will become more apparent from the following specification in which I have described one embodiment thereof, reference being made to the accompanying drawings forming a part of this specification and in which like characters are employed to designate like parts throughout the same.

In the drawings:

Fig. 2 is a rear elevation of my machine,

Fig. 3 is an end elevation of the same,

Figure 9:
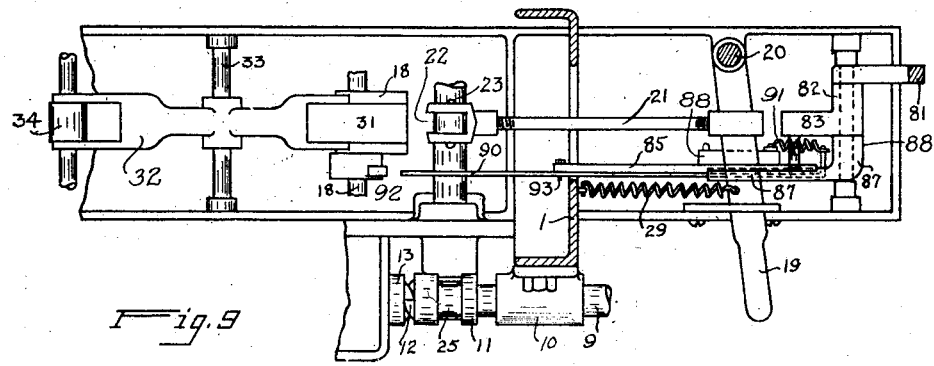
Figure 7:
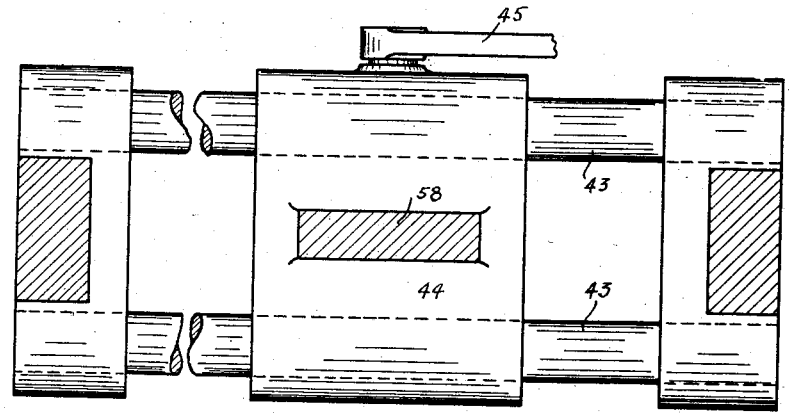
Figure 6:
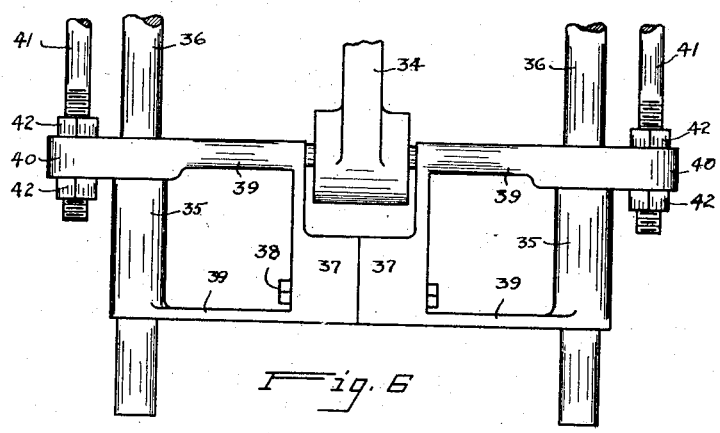

Fig. 6 is an enlarged detail view of the lower crosshead and guide rods associated with the cutter mechanism, Fig. 7 is an enlarged plan view of mechanism associated with the carriage clutch mechanism, Fig. 8 is a transverse section through the bed and carriage showing how the carriage clutch operates to move the carriage, Fig. 9 is an enlarged detail view of the power clutch operation mechanism, Fig. 10 is an enlarged detail view of the indexing mechanism, Fig. 11 is a sectional view of the indexing mechanism, Fig. 12 is an enlarged detail of the driving worm, Fig. 13 is an enlarged detail view of the stripper plate elevating mechanism, Fig. 14 is a section taken on line 14—14 of Fig. 2, Fig. 15 is an enlarged detail view of part of the automatic stop stripping mechanism, Fig. 16 is an enlarged detail of part of the indexing mechanism in front elevation, Fig. 17 is a side elevation of the same, Fig. 18 is a rear elevation of the same, Fig. 19 is a bottom view of the carriage drawn to small scale and showing the clutch engaging bar, Fig. 20 is a plan view of a modification of my driving mechanism consisting of a hand wheel and suitable gearing associated therewith for manually operating the apparatus, Fig. 21 is a section taken on line 21—21 of Fig. 3.

Figure 1:
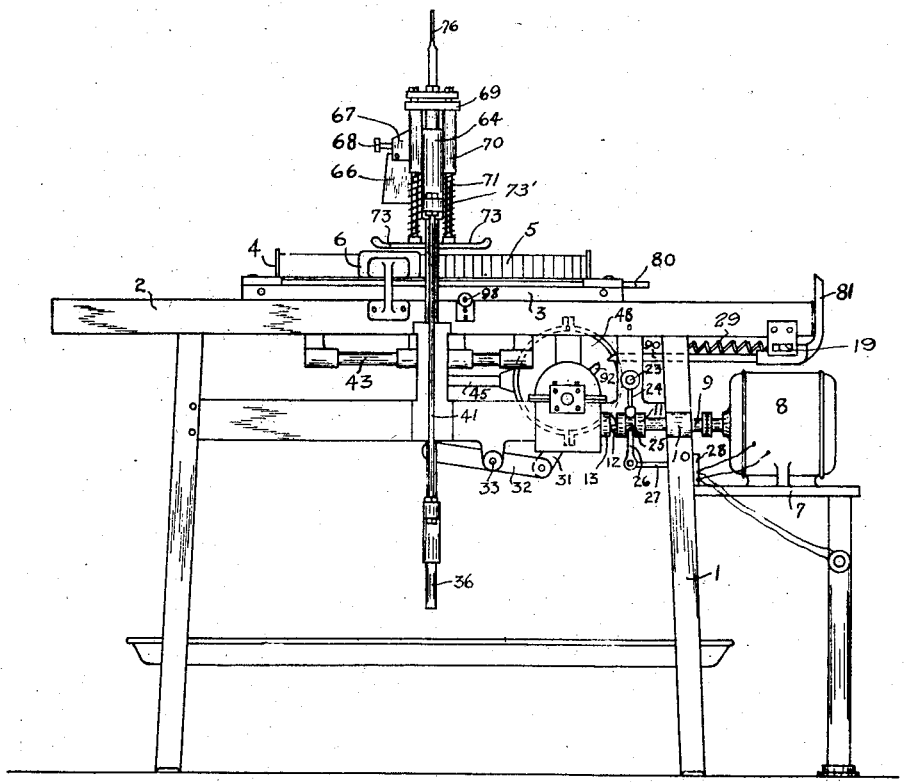
Fig. 1 is a front elevation of my machine.

Referring to the drawings, particularly Figs. 1 and 2, it will be seen that I provide a supporting frame 1 on which is supported a carriage bed 2. A material supporting carriage 3, having removable end plates 4 for positioning a slab of material 5, is provided to reciprocate along a track formed on the upper surface of the bed 2. Suitable material side positioning plates 6 are secured on opposite sides of the member 2 and engage the sides of the slab 5 to guide it, while the carriage 3 is being moved under the cutters.

At one end of the frame 1, I provide a support 7 for supporting a power device, such as an electric motor 8. The motor shaft 9 extends inwardly beneath the bed 2 and is supported by a suitable bearing 10 formed in frame 1, the free end of the shaft 9 having a clutch collar 11 slidably mounted thereon to rotate with the shaft 9. This collar is provided on one of its end faces with clutch teeth 12 which engage similar teeth 12 on a second clutch member 13 keyed to a shaft 14, Fig. 12, which is mounted to rotate in suitable bearings in the housing 15. Intermediate the ends of the shaft 14 I provide a worm 16 which is in mesh with a worm gear 17 keyed to one end of a crank shaft 18. In Fig. 9 which is an enlarged detail view of the power clutch mechanism together with means for operating the clutch, which preferably consists of an operating lever 19 pivoted at 20 below the bed 2, a connecting rod 21 connects the lever 19 with a crank arm 22 keyed to a shaft 23. One end of the shaft 23 is provided with an arm 24, a portion of which engages an annular recess 25 in the collar 11. The arm 24 is provided with an extension 26 which is connected through a link 27 to a suitable electric switch 28. It will be seen, therefore, that movement of the lever 19 to the left of Fig. 9 will rock the shaft 23 and cause the collar 11 to move to the right along shaft 9 disengaging the clutch teeth 12, at the same time opening the electric switch 28 and disrupting the electric circuit to the motor 8, thus stopping the motor. A spring 29 secured at one end to the frame member 1 and at the other end to the lever 19 normally tends to hold the lever 19 toward the left in Fig. 9, whereby the clutch will be disengaged and the power cut off from the motor 8. Upon movement of the lever 19 toward the right, in which position it is shown in Fig. 9, the spring 29 is placed under tension, the clutch members are engaged and the electric circuit is completed through the motor to drive shafts 9 and 14. The lever 19 is held in the position shown in Fig. 9 by trip mechanism which will be referred to hereinafter.

The crank shaft 18 mounted in suitable bearings 30 carries at one end a worm gear 17 within the housing 15 and in mesh with the worm 16. A connecting rod 31 is pivotally connected at one end to the crank shaft 18 and at the other end to a double-clevis 32 pivoted at 33. The other end of the double-clevis 32 is pivotally connected through a link 34 to a lower crosshead 35 which is mounted to reciprocate along the guide rods 36. As shown in detail in Fig. 6 the crosshead consists of sections 37 bolted together as at 38, each section including a sleeve 35 which is adapted to slidably move along one of the guide rods 36, and a frame member 39 having an extension 40 to which a spacer rod 41 is adjustably secured by means of the nuts 42.

Suitably suspended below the bed 2, is a pair of clutch member supporting rods 43 on which a clutch carrying member 44 is adapted to reciprocate. Motion is transmitted to the members 44 by means of a connecting rod 45, one end of which is pivotally connected to the member 44 while the other end is connected to an indexing disc carrying member 46. This disc member 46 is preferably composed of sections bolted together as shown in detail in Fig. 10. These sections are provided with complementary internal arcuate grooves 47 which are adapted to seat the periphery of an index disc 48. A plate 49 is provided with an opening whereby the plate may be keyed upon the free end of shaft 18, so that the plate will revolve with the shaft. The index disc 48 is clamped to a shoulder formed on the plate 49 by means of a clamping member 50 which engages the disc 48 and is secured in position by means of a bolt 51. This shoulder 50' projects through and is movable lengthwise in a slot 48' formed in the disc 48. A pin 52 is carried by the member 50 and enters an opening in the plate 49 when the plate and disc are drawn together tightly by the bolt 51. This pin serves to prevent rotational displacement of the clamp 50 with respect to the disc and plate. The disc 48 is provided with series of index holes 53 arranged in various spaced relations so as to provide the proper index for making the desired number of cuts in a given quantity of material. Similar holes 53' are provided in the plate 49 and are so arranged that any one hole of the disc may be brought into alignment with the corresponding hole in the plate. A key 54 may be inserted through the aligned openings so as to maintain the proper index relation between the plate and the disc. The clamp 50, when tightened, will further act to preserve this index relation. The holes 53 and 53' are arranged in double rows above and below the central opening of the disc, the distance between the adjacent holes of each row varying according to the number of cuts to be made by the machine per given quantity of material. It will be noted that I have numbered these indexing holes in double series, as follows: "1", "4", "6" and "8" being in one of the rows of one of the sets, and "3", "5" and "7" being in the other row of the set. Similarly, I have provided holes "9", "11", "13" and "15" comprising one of the rows of the other set and holes "10", "12", "14" and "16" which comprise the other row of the last named set. As previously stated the distance from center to center of certain of the holes varies according to the desired number of cuts to be made in a predetermined quantity of material. By way of illustration, when it is desired to cut a slab of ice cream or other material into a predetermined number of sections, for example, 3 sections per quart of ice cream, the hole "3" will furnish the correct index for this combination of cuts. The bolt 51 is loosened and the plate and disc are shifted until the hole "3" in the disc is in alignment with the corresponding hole in the plate 49. The key 54 is inserted through the aligned opening and the bolt 51 is again tightened, when the machine may be started. The disc will revolve within the casing 46 about a center defined by shaft 18 and will cause the casing to act as a cam in moving about its center which is shaft 18. This motion is transmitted to the arm 45 and causes it to reciprocate the movable clutch which controls the movement of the carriage 3. Since the holes above referred to are spaced at various distances practically any number of cuts per given quantity of material may be made by selecting the proper hole in the index disc. By way of example, the holes may be arranged to make the following number of cuts per quart of ice cream;

Hole "1" will give 1 cut to the quart,
Hole "3" will give 3 cuts to the quart,
Hole "4" will give 4 cuts to the quart,
Hole "5" will give 5 cuts to the quart, etc.

Where more than one knife is used in cutting and particularly where the knives are arranged in different planes to each other, it is obvious that even greater numbers of cuts may be made in the material. The use of additional knives will be referred to as this description progresses.

I have provided a compound clutch mechanism for moving the carriage beneath the cutters in step by step movement, in such a manner that as the knives are in position to pass through the material to be cut, the carriage will be held stationary, yet while the cutters are lifted above the material to be cut the carriage is caused to be moved a predetermined distance along the bed 2 in preparation for the next cut, whereupon the knives will be lowered to make the advance cut.

Figure 4:
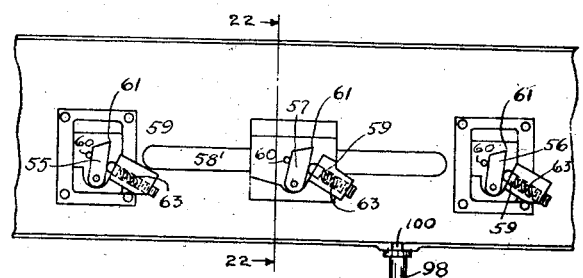
Fig. 4 is an enlarged plan view of the carriage clutch mechanism.

This clutch mechanism is shown in enlarged detail in Fig. 4 and consists of dogs 55 and 56 carried by and pivoted to the bed 2, and a third dog 57 pivoted to and carried by a movable support 58 which latter is mounted on the member 44 and which projects through a slot 58' in the bed 2. Each of the dogs 55, 56 and 57 is projected toward the left in Fig. 4 by means of spring pressed plungers 59. Movement of the dogs toward the left in Fig. 4 is limited by means of stop pins 60. The outer end faces of the dogs are beveled to form carriage engaging edges 61. The carriage 3 is provided on its under surface with a rail 62 which is engaged by the edges 61 of the dogs. Movement of the support 58, upon which the dog 57 is carried, toward the right in Fig. 4 will cause the edge 61 of the dog 57 to engage the side walls of the rail 62, thereby moving the carriage to the right in Fig. 1 at a distance equal to the movement of member 44. During this movement of the carriage, the dogs 55 and 56, which are mounted on the bed 2 will be caused to swing slightly toward the right in Fig. 4 against the tension of springs 63 while the dog 57 is in biting contact with a side wall of the rail 62 of the carriage. As the member 44 carrying dog 57 moves toward the left in Fig. 4, the dogs 55 and 56 will prevent back movement of the carriage by engaging the rail 62, while the dog 57 will be free to move toward the left to again engage the rail 62 on the next step. The movements of the dogs just described define one step movement of the carriage. These steps are repeated successively by reciprocation of the member 44 on the guide rods 43 by power transmitted through the indexing mechanism, until the carriage has reached the extreme right hand end of frame 1, Fig. 1, and the material supported on the surface of the carriage has passed beneath the knives. When the carriage has reached this position the material will have been cut as desired and may then be removed from the carriage, whereupon the carriage may be removed from the extreme right of the frame 1, Fig. 1, and a new quantity of material placed thereon and the carriage replaced on the left hand end of the frame and the operations repeated.

The material cutters are preferably arranged above the material as shown in Figs. 1, 2 and 3. As has been described heretofore the crosshead 35 is caused to reciprocate upon the lower ends of the guide rods 36 by means of power transmitted through the lever 32. A second crosshead 64 is reciprocable upon the upper ends of the guide rods 36 and is connected to the first named crosshead by means of the spacing rods 41. As shown in Fig. 3 I provide a transverse knife 65 which is connected at its ends to the sides of the crosshead 64 and is adapted to reciprocate with the crosshead in the path of the material to be cut. If desired one or more other knives 66 arranged preferably at right angles to the knife 65 and mounted in holders 67 may be secured to the crosshead 64 by means of bolts 68 to cut the material lengthwise. It is obvious that I may use other combinations of knives and cutters to make various numbers of cuts for each downward movement of the crosshead 64, if desired. Such combinations may include knives arranged at various acute and/or obtuse angles to each other, if desired, although I prefer to make such cuts at substantially right angles when more than one cutter is used.

Figure 5:
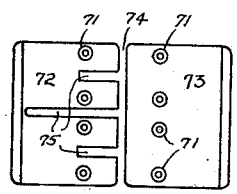
Fig. 5 is a detail view of the stripper plates.

A plate 69 is removably secured to the top ends of the guide rods 36 and is adapted to support in a suspended position a multiplicity of cylinders 70 in which plungers 71 are adapted to reciprocate. The lower ends of the plungers are adapted to carry stripper plates 72 and 73 which are shown in detail in Fig. 5. These stripper plates are adapted to engage the upper surface of the material to be cut to firmly hold it while the cut is made and are spaced as at 74, Fig. 5, to permit the transverse knife 65 to pass therebetween. The stripper plate 72 is slotted at 75 to permit passage of the longitudinal knives or cutters 66.

The stripper plates 72 and 73 and the plungers 71 are adapted to be moved upwardly against the compression of springs 73 when the knives are out of the path of the material, the spring service to lower the plunger and plates when the carriage has come to rest. Such upward movement is accomplished by means of actuating rods 76 which are slidable within openings in the plate 69. Each of the rods 76 is supported by the crosshead 64 on the upper part thereof and are adapted to reciprocate therewith and through the openings in the plate 69. Each of the rods is somewhat flattened near one end to provide an irregular roller engaging surface. I provide rollers 77 carried within cavities formed between a plate 78 and the plate 69. These rollers are disposed one on each side of the respective rods 76 to engage the normal and flattened surfaces as the rods move between the rollers. When in the position shown in Fig. 13, the rollers are shown in engagement with the flattened rod surfaces at which time the knives are in the path of the movement of the material. When the crosshead 64 carrying the knives is raised the rods 76 will likewise be raised until their lower widened roller engaging surfaces 79 come into contact with the roller 77, whereupon the rollers will be moved away from each other to engage and raise the plate 78. The plungers 71 extend through the cylinders 70 and the plate 78 and are provided with nuts 79 thereon so that when the plate 78 is caused to move upwardly, the plungers 71 and the stripper plates 72 and 73 will likewise be lifted.

I have provided means for automatically stopping the operation of my machine when the carriage 3 reaches the extreme righthand end of the bed in Fig. 1 which consists of a tripping member 80 rigidly supported on the end of the carriage, and being adapted to engage a trip 81 pivotally supported below the bed 2 upon a fixed shaft 82. The trip 81 is provided with an arm 83 having a tripping stud or pin 84 therein, and extends transversely below the bed 2 to engage a member 85. The member 85 is cut away at 86 to provide a recess in which the lever 19 is movable, one end of the member 85 normally resting on the pin 84. A spring 86' intermediate the bottom of the bed 2 and the arm 83 is adapted to normally maintain the trip 81 in a position to be engaged by the member 80 on the carriage. A member 88 having a lever retaining trip 87 formed thereon is also rockably mounted on the shaft 82 and is rockable independently of the member 83. The trip 87 is hooked at one end to engage an edge of the lever 19, when the latter is toward the right, as shown in Fig. 9, to retain the lever in this position so that the power clutch and electric switch will be in closed position to operate the machine. The member 88 is suspended below the bed 2 and is provided with a longitudinal opening for the reception of the end of a tripping rod 90. A spring 91 is secured at one end to the member 88 and at the other end to an end of the rod 90 and normally tends to force the rod to the right in Fig. 15 to project its other end into the path of a trip 92, which is revoluble with the crank shaft 18. The rod 90 is maintained in a retracted position within the member by means of the end of the member 85, which is pivotally connected to the rod 90 at 93.

The lever arm 81 is disposed in the path of the tripping member 80 which, when the carriage is moved to its extreme left position as viewed in Fig. 2, engages the arm 81 and rotates it on the shaft 82. The pin 84 effects a lifting of the detent arm 85 from the spring pressed blade 19 of the lever from the notch 89. The lever 19 is thereafter retained in clutch engaging position by the hooked end 105 of the lever or trip 87. Disengaging the arm 85 from the lever 19, permits the spring 91 to longitudinally propel the rod 90 until its free end is projected into the path of the trip 92. Thereafter, rotation of the trip 92 on the shaft 82 will lift the end of the rod 90 and communicate this movement to the member 88 and hooked member or trip 87, rocking them around the shaft 82 and disengaging the hooked end 105 from the lever 19 permitting it to move under the force of the spring 29 to effect separation of the clutch elements 12 and 13 to disconnect the electric motor shaft from the transmission of the machine, thus stopping movement of the carriage. The electric switch 28 is at the same time operated by the rod 27 by means of the lever 26 to stop the motor 8 upon the movement of the clutch element 12 above mentioned.

In Fig. 20 I have shown a modification of my invention including a means for manually operating my machine which consists of a hand wheel 94 keyed to a shaft 95 which is supported in suitable bearings on the frame 1. A pinion 96 is also keyed to the shaft and meshes with a larger pinion 97 which is keyed to the crank shaft 18. In this form of my invention I have eliminated the automatic stop tripping mechanism and except for the construction just outlined regarding this modification, it is otherwise identical with the preferred form of my invention herein described.

I have provided a spring retracted plunger device 98 on the side of the bed 2 and located in such a position that when the plunger is projected, as by applying a pushing force against the plunger head 99, the end 100 of the plunger will act as a stop in setting the carriage into position for starting the machine.

It is to be understood that various changes may be made in the construction of the apparatus herein described without departing from the spirit of my invention or the scope of the subjoined claims.

What I claim is:

1. In a material cutting machine, a frame, a bed formed on said frame, a material supporting carriage movable along said bed, a clutch engaging member carried by said carriage, cutters movable in the path of movement of said carriage, a clutch dog pivoted on the frame and spring-pressed against the clutch engaging member of the carriage, a movable clutch operating element, a clutch dog pivoted on the clutch operating element and engageable with the clutch engaging member of the carriage, the movement of said clutch operating element in one direction causing the dog thereon to engage the carriage and advance it a distance directly proportional to the extent of movement of the clutch operating element and in the path of movement of said cutters, and the clutch dog pivoted on the frame concurrently preventing movement of the carriage in the opposite direction, a source of power for operating said carriage and said cutters, and an indexing mechanism for adjustably varying the degree of movement of the movable clutch operating element, and tripping mechanism carried by said frame and actuated by said carriage at its limit of movement in one direction for disengaging the machine from its source of power.

2. In a material cutting machine, the combination of a frame, a bed formed on said frame, a material supporting carriage movable along the said bed, a source of power, an automatic tripping mechanism operable by said carriage at its limit of movement in one direction along said bed, a clutch actuated by said tripping mechanism for disconnecting the source of power from the machine, cutters mounted for movement within the path of movement of said carriage, said cutters being moved within the path of the material when the carriage is at rest, and indexing means operable by said source of power for imparting a predetermined step by step movement to said carriage, said indexing means comprising an eccentric cam and means thereon for varying the throw thereof, a reciprocatory clutch mechanism movable in accordance with the throw of said eccentric and adapted to engage the carriage to move it upon reciprocatory movement in one direction an amount directly proportional to the throw of the eccentric.

3. In a machine for cutting an elongated block of plastic material, such as ice cream or the like, into a plurality of equal sized cakes, the combination with a machine bed having a a longitudinally extending guide, of a carriage longitudinally movable on the bed and adapted to support the material to be cut, an upright cutter support extending upwardly from the bed, and a cutter element journaled for vertical reciprocation in the support and comprising a transverse blade vertically reciprocable through the material, common driving means for the carriage and the reciprocating cutter comprising a ratcheting mechanism for advancing the carriage by a step by step movement on the guide and a rocker arm for operating the cutter, means for variably effecting the step by step movement of the carriage on the guide comprising a ratcheting device, an arm for operating the ratcheting device, and an adjustable connection between the common driving means and the arm, said adjustable connection comprising a pair of superposed plates, a plurality of separately alignable apertures through the plates, a pin insertable through any pair of aligned apertures, one of said plates adapted to be rotated by the common driving means, the other of said plates being joined to the end of the arm and forming an eccentric drive thereof by motion communicated from the rotatable plate.

4. In an ice cream cutter, a frame, a horizontal bed, a carriage longitudinally movable on the bed adapted to support ice cream to be cut into sections, a cutter mounting for vertical reciprocation through the ice cream from a point above the ice cream, means for advancing the carriage on the bed in a step by step movement, said means comprising a reciprocable clutch, an arm for operating said clutch, a driving shaft, and an eccentric connection between the driving shaft and said arm comprising a pair of plates, each having a plurality of apertures therethrough, a number of the apertures of the one plate being separately and individually alignable with particular apertures of the other plate, said apertures being disposed at varying distances from the plate centers, a pin adapted to be inserted through aligned apertures of the two plates, and means effective by placement of said pin to vary the thrust of said arm.

5. In a machine for cutting an elongated block of plastic material, such as ice cream or the like, into a plurality of equal sized cakes, the combination with a machine bed having a longitudinally extending guide, of a carriage longitudinally movable on the bed and adapted to support the material to be cut, an upright cutter support extending upwardly from the bed, and a cutter element journaled for vertical reciprocation in the support and comprising a transverse blade vertically reciprocable through the material, common driving means for the carriage and the reciprocating cutter comprising a ratcheting mechanism for advancing the carriage by a step by step movement on the guide and a rocker arm for operating the cutter, means for variably effecting the step by step movement of the carriage on the guide comprising a ratcheting device, an arm for operating the ratcheting device, and an adjustable connection between the common driving means and the arm, said adjustable connection comprising a pair of superposed plates, a plurality of separately alignable apertures through the plates, a pin insertable through any pair of aligned apertures, one of said plates adapted to be rotated by the common driving means, the other of said plates being joined to the end of the arm and forming an eccentric drive thereof by motion communicated from the rotatable plate, and controlling means for the common driving means comprising a trip mechanism, said trip mechanism comprising a lever arm, a spring therefor, a clutch interposed between the common driving means and the mechanism of the machine, connections adapted to communicate motion from the arm to the clutch to actuate it to disassociate the common driving means from the mechanism, said spring tending to move the clutch to open position and trip means comprising an element carried by the carriage and an element carried by the bed at an end thereof, adapted to release said arm from a clutch actuating position thereof.

6. In a machine for cutting an elongated block of plastic material, such as ice cream or the like, into a plurality of equal sized cakes, the combination with a machine bed having a longitudinally extending guide, of a carriage longitudinally movable on the bed and adapted to support the material to be cut, an upright cutter support extending upwardly from the bed, and a cutter element journaled for vertical reciprocating in the support and comprising a transverse blade vertically reciprocable through the carriage, common driving means for the carriage and the reciprocating cutter comprising a ratcheting mechanism for advancing the carriage by a step by step movement on the guide and a rocker arm for operating the cutter, means for variably effecting the step by step movement of the carriage on the guide comprising a ratcheting device, an arm for operating the ratcheting device, and an adjustable connection between the common driving means and the arm, said adjustable connection comprising a pair of superposed plates, a plurality of separately alignable apertures through the plates, a pin insertable through any pair of aligned apertures, one of said plates adapted to be rotated by the common driving means, the other of said plates being joined to the end of the arm and forming an eccentric drive thereof by motion communicated from the rotatable plate, and controlling means for the common driving means comprising a trip mechanism, said trip mechanism comprising a lever arm, a spring therefor, a clutch interposed between the common driving means and the mechanism of the machine, connections adapted to communicate motion from the arm to the clutch to actuate it to disassociate the common driving means from the mechanism, said spring tending to move the clutch to open position and trip means comprising an element carried by the carriage and an element carried by the bed at an end thereof, adapted to release said arm from a clutch actuating position thereof, and manually restoring means for said mechanism, comprising a handle on the lever.

7. In a machine for cutting material in pieces, a main bed, a carriage on the bed for supporting material to be cut, a reciprocable knife for cutting material, means for advancing the carriage on the frame step by step between cuts, said means comprising a clutch engageable element on the carriage disposed substantially in the direction of movement of the carriage, a clutch operating element movable with a reciprocatory movement, a clutch dog on the clutch operating element adapted to grip the clutch engageable element and move it when the clutch operating element is reciprocated in one direction and to move thereon when the clutch operating element is moved in the other direction and means for preventing movement of the carriage in the opposite direction, said means comprising a clutch dog pivoted on the frame and gripping the clutch engageable element of the carriage.

8. In a machine for cutting material in pieces, a main frame, a carriage on the frame for supporting material to be cut, a reciprocatory knife, means for advancing the carriage on the frame step by step between cuts, said means comprising a rotary shaft, an eccentric cam on the shaft, a clutch between the eccentric cam and the carriage adapted to grip the carriage and move it on throw of the cam in one direction a distance directly proportional to the throw of the cam and to disengage it on throw of the cam in the other direction and means on the cam whereby the extent of its throw may be adjusted to vary the amount of movement of the carriage.

In testimony whereof I hereunto affix my signature this 28th day of August, 1925.

WILLIAM E. KAY.